(12) United States Patent
Schoner et al.

(10) Patent No.: US 9,400,902 B2
(45) Date of Patent: Jul. 26, 2016

(54) MULTI-MODAL ENTITY TRACKING AND DISPLAY

(71) Applicant: Trimble Navigation Limited, Sunnyvale, CA (US)

(72) Inventors: Bernd Schoner, Cambridge, MA (US); Ravikanth Pappu, Cambridge, MA (US); Satyan Shah, Bedford, MA (US); Brian Fiegel, Iowa City, IA (US); John Biondo, Thornton, CO (US)

(73) Assignee: Trimble Navigation Limited, Sunnyvale, CA (US)

( * ) Notice: Subject to any disclaimer, the term of this patent is extended or adjusted under 35 U.S.C. 154(b) by 407 days.

(21) Appl. No.: 13/669,365

(22) Filed: Nov. 5, 2012

(65) Prior Publication Data
US 2013/0314210 A1 Nov. 28, 2013

Related U.S. Application Data (60) Provisional application No. 61/650,433, filed on May 22, 2012, provisional application No. 61/722,057, filed on Nov. 2, 2012.

(51) Int. Cl.
| | |
|---|---|
| *G08B 13/24* | (2006.01) |
| *G06K 7/10* | (2006.01) |
| *G06K 19/077* | (2006.01) |
| *H01Q 1/22* | (2006.01) |
| *G06Q 10/06* | (2012.01) |
| *G06K 17/00* | (2006.01) |
| *G06Q 10/08* | (2012.01) |

(52) U.S. Cl.
CPC ...... *G06K 7/10366* (2013.01); *G06K 19/07766* (2013.01); *G06Q 10/06* (2013.01); *G08B 13/2485* (2013.01); *H01Q 1/2208* (2013.01); *G06K 2017/0045* (2013.01); *G06K 2017/0051* (2013.01); *G06Q 10/08* (2013.01); *G06Q 10/083* (2013.01); *G06Q 10/0833* (2013.01); *G08B 13/2462* (2013.01)

(58) Field of Classification Search
CPC ......... H04W 8/06; H04W 8/08; H04W 8/043; G08B 13/2462; G08B 13/2485; G08B 21/0272; G01S 5/0284; G01S 5/0289
USPC .............. 340/572.1, 539.13, 568.1; 455/12.1, 455/456.1, 456.3; 705/28
See application file for complete search history.

(56) References Cited

U.S. PATENT DOCUMENTS

| | | |
|---|---|---|
| 5,977,913 A | 11/1999 | Christ |
| 6,339,709 B1 | 1/2002 | Gladwin et al. |
| 7,123,149 B2 | 10/2006 | Nowak et al. |

(Continued)

*Primary Examiner* — Travis Hunnings
*Assistant Examiner* — Benyam Haile
(74) *Attorney, Agent, or Firm* — Kilpatrick Townsend & Stockton LLP (57) ABSTRACT

A multi-modal entity tracking and display system is disclosed. In one embodiment, a tracking infrastructure comprising at least one data receiver is configured to detect a tracked entity comprising a first asset class using a first sensing technology and a second sensing technology. The at least one tracking data receiver is further configured to generate a tracking data report conveying a location of the tracked entity. A multi-modal entity tracker is configured to receive and store the tracking data report. The multi-modal entity tracker is further configured to receive and store a second tracking data report of a second tracked entity comprising a second asset class which is conveyed via the tracking infrastructure.

23 Claims, 6 Drawing Sheets

(56) References Cited

U.S. PATENT DOCUMENTS

| | | |
|---|---|---|
| 7,293,645 B2 | 11/2007 | Harper et al. |
| 7,633,392 B2 | 12/2009 | Neuwirth |
| 7,791,455 B1 * | 9/2010 | MacLean et al. ............ 340/10.5 |
| 7,843,343 B2 * | 11/2010 | Thorn ........................ 340/572.1 |
| 7,885,763 B2 | 2/2011 | Havens |
| 8,073,795 B2 | 12/2011 | Honisch |
| 8,423,042 B2 | 4/2013 | Markhovsky et al. |
| 8,477,013 B2 | 7/2013 | Sarma et al. |
| 8,660,914 B2 | 2/2014 | Soppera et al. |
| 8,698,637 B2 | 4/2014 | Raichman |
| 8,903,416 B1 | 12/2014 | Perkins et al. |
| 2005/0253704 A1 | 11/2005 | Neuwirth et al. |
| 2006/0055552 A1 | 3/2006 | Chung et al. |
| 2006/0055564 A1 * | 3/2006 | Olsen et al. .................... 340/994 |
| 2007/0075898 A1 * | 4/2007 | Markhovsky et al. ........ 342/386 |
| 2008/0133127 A1 | 6/2008 | Havens et al. |
| 2008/0198001 A1 | 8/2008 | Sarma et al. |
| 2009/0177603 A1 * | 7/2009 | Honisch ......................... 706/45 |
| 2011/0167010 A1 * | 7/2011 | Soppera ............. G06Q 30/0185 705/318 |
| 2011/0199211 A1 | 8/2011 | Campero et al. |
| 2012/0253862 A1 * | 10/2012 | Davidson .................... 705/7.11 |
| 2012/0286933 A1 | 11/2012 | Hsiao et al. |
| 2013/0080049 A1 * | 3/2013 | Brucker et al. ............... 701/445 |
| 2013/0127596 A1 * | 5/2013 | Jain et al. ..................... 340/10.1 |
| 2013/0169415 A1 | 7/2013 | Bellows et al. |
| 2013/0231760 A1 * | 9/2013 | Rosen et al. .................... 700/91 |
| 2014/0035726 A1 | 2/2014 | Schoner et al. |

* cited by examiner

FIG. 6

MULTI-MODAL ENTITY TRACKING AND DISPLAY

CROSS REFERENCE TO RELATED U.S. APPLICATIONS

This application claims priority to and benefit of U.S. Provisional Patent Application No. 61/650,433, entitled "MULTI-MODAL ENTITY TRACKING AND DISPLAY," by Bernd Schoner et al., with a filing date of May 22, 2012.

This application claims priority to and benefit of U.S. Provisional Patent Application No. 61/722,057, entitled "MULTI-MODAL ENTITY TRACKING AND DISPLAY," by Bernd Schoner et al., with a filing date of Nov. 2, 2012.

BACKGROUND

Presently, entities such as people and assets (machines, tools, materials, objects, etc.) are not often tracked on a construction sites. However, in some limited senses, Global Navigation Satellite System (GNSS) location sensing technologies (e.g., GNSS receivers) may be used to track some assets while other controls such as a Radio Frequency Identification (RFID) tag may be used in conjunction with an entry control access to track entry or exit of a person and/or asset through a control point, such as a gate. Conventionally, however, if tracking of people and/or assets occurs at all, only a single location sensing technology such as GPS, Wi-Fi, or RFID appears to be used in isolation for tracking the tracked entity.

BRIEF DESCRIPTION OF THE DRAWINGS

The accompanying drawings, which are incorporated in and form a part of this application, illustrate embodiments of the subject matter, and together with the description of embodiments, serve to explain the principles of the embodiments of the subject matter. Unless noted, the drawings referred to in this brief description of drawings should be understood as not being drawn to scale.

DESCRIPTION OF EMBODIMENTS

Reference will now be made in detail to various embodiments, examples of which are illustrated in the accompanying drawings. While the subject matter will be described in conjunction with these embodiments, it will be understood that they are not intended to limit the subject matter to these embodiments. On the contrary, the subject matter described herein is intended to cover alternatives, modifications and equivalents, which may be included within the spirit and scope as defined by the appended claims. In some embodiments, all or portions of the electronic computing devices, units, and components described herein are implemented in hardware, a combination of hardware and firmware, a combination of hardware and computer-executable instructions, or the like. Furthermore, in the following description, numerous specific details are set forth in order to provide a thorough understanding of the subject matter. However, some embodiments may be practiced without these specific details. In other instances, well-known methods, procedures, objects, and circuits have not been described in detail as not to unnecessarily obscure aspects of the subject matter.

Notation and Nomenclature

Unless specifically stated otherwise as apparent from the following discussions, it is appreciated that throughout the present Description of Embodiments, discussions utilizing terms such as "determining," "monitoring," "providing," "initiating," "generating," "wirelessly communicating," "wirelessly acquiring," "wirelessly providing," "accessing," "communicating," "using," "coupling," "communicatively coupling" or the like, often (but not always) refer to the actions and processes of a computer system or similar electronic computing device such as, but not limited to, a display unit and/or a lifting device sensor unit or component thereof. The electronic computing device manipulates and transforms data represented as physical (electronic) quantities within the electronic computing device's processors, registers, and/or memories into other data similarly represented as physical quantities within the electronic computing device's memories, registers and/or other such information storage, processing, transmission, or/or display components of the electronic computing device or other electronic computing device(s). For the purpose of the present discussion, the term "free flow" location sensing refers to the sensing of assets without the active participation of an individual, such as by using an RFID reader and/or GNSS sensor that sense the location without a person taking active participation in the process. Additionally, the term "sensing for secure access" refers to of a person or asset at a secure check point that grants access only if proper credentials are presented. For the purpose of the following discussion, the term "reverse RFID" refers to a system that is based upon mobile RFID readers interactive with stationary RFID tags and uses relevant information stored on the RFID tags to determine the location of a tracked entity. The term "forward RFID" refers to a system that is based on RFID tags placed on mobile tracked entities.

Overview of Discussion

The following discussion will begin with a description of an example multi-modal entity tracking system in accordance with at least one embodiment. Discussion continues with a description of example applications enabled by a multi-modal entity tracking system in accordance with various embodiments follows. Then, a discussion of an example implementation of an example implementation of a multi-modal entity tracking system in accordance with various embodiments follows. Discussion then turns to a discussion of an example computer system environment upon which embodiments of a multi-modal entity tracking system can be implemented.

Example Multi-Modal Entity Tracking System

Herein, multi-modal tracking of tracked entities (people and assets) is described where at least two types of location sensing technology are employed for locating and tracking entities such as people and/or assets on a construction site as part of a multi-modal construction site entity tracking system ("System"). An overview of this system is depicted by the multi-modal tracking and display infrastructure (e.g., system 100) shown in FIG. 1. All of the features illustrated in FIG. 1 may not be present in every embodiment of the system, and some embodiments may include additional or alternative features other than those illustrated. Other location sensing technologies, which utilize only a single mode, may also be used in conjunction with multi-modal location sensing technologies in some embodiments. That is to say, although the system employs multi-modal location sensing and tracking of some people and/or assets may also track some people and/or assets using only a single mode of location sensing technology. One or more entity tracking databases are included within or accessed by the system and include various characteristics that are associated with a person or asset. For example, a person may have one or more characteristics such as a name, employer, employee number, type of trade, qualification level within a trade (e.g., apprentice, journeyman, master, or the like), certification status, immigration status, security clearance level, biometric(s), physical description, photograph, assigned supervisor, emergency contact info, current tracked location, authorized locations, and history log of locations, among other characteristics. An asset may have one or more characteristics such as asset type, when acquired, history of use, delivery time, service information, physical description, photograph, serial number or other identifying information, current tracked location, authorized locations, and history log of locations, among other characteristics. Additionally, one or more modes of location sensing technology may be associated with a person or asset such that when a report is received from a mode of location sensing technology that is assigned to a person or asset, a database entry for the person or asset can be accessed, updated, and reported out if there is some violation of a rule noted by the system.

Figure 1:
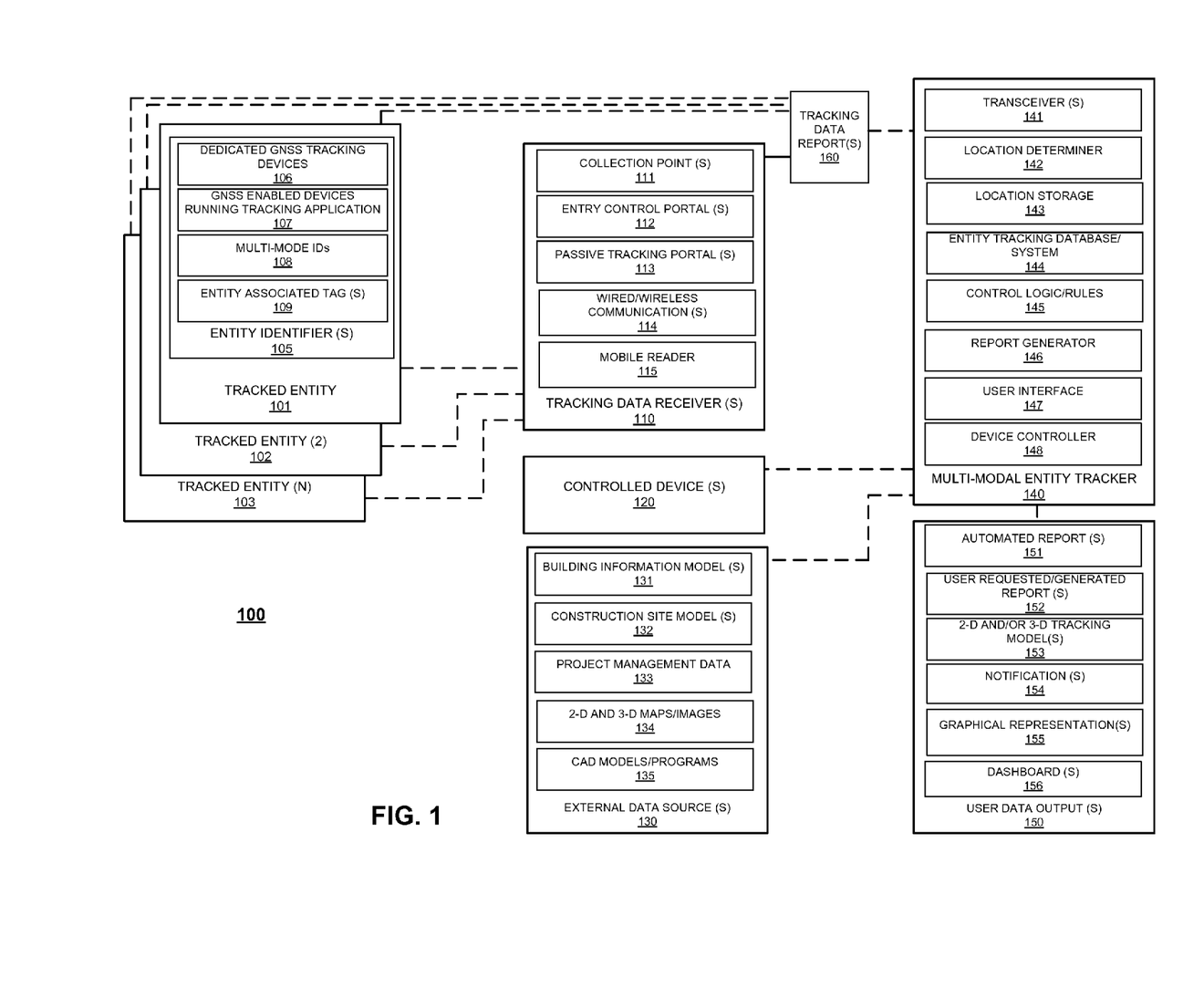
FIG. 1 is a diagram of an example multi-modal construction site entity tracking system, in accordance with an embodiment.

FIG. 1 is a diagram of an example multi-modal construction site entity tracking system 100, in accordance with an embodiment. It is noted that the components of system 100 shown in FIG. 1 may be implemented on a single device, multiple devices, or in a cloud computing environment in accordance with various embodiments. As described in FIG. 1, the system 100 tracks a tracked entity (e.g., tracked entity 101, tracked entity 2 (e.g., tracked entity 102 of FIG. 1), tracked entity N (e.g., 103 of FIG. 1)) via one or more entity identifiers 105 carried by or affixed to, or otherwise in close proximity to the tracked entity 101. An entity identifier 105 reports to either a tracking data receiver 110 or transceiver 141 of the multi-modal entity tracker 140. For example, passive entity trackers (RFID tags) may be read by a tracking data receiver 110 which then conveys a report about the tracked entity 101 to multi-modal entity tracker 140.

Entity Identifier(s)

A tracked entity 101 may be identified by a multi-mode identification 108 (e.g., a card or small device that includes a plurality of wireless communication capabilities such as several RFIDs that operate respectively on several different frequencies and/or an active RFID reader for corresponding with RFID tags at known locations on a construction site). Such a card/device may include standoffs to separate passive RFIDs from the body of a person to prevent interference. By corresponding with several tags at known locations an active RFID reader used as an entity tracker (e.g., multi-mode ID 108 of FIG. 1) can use trilateration (by time of flight, signal strength measurement, and/or phase measurement) to ascertain its location in three dimensions relative to the known locations of the corresponded RFID tags. A multi-mode ID 108 has many modes of operation which, when registered with the system and to the person, can be accessed and read by various tracking data receivers 110 such as portals that are associated with the system 100 (e.g., one RFID read when entering an entry control portal which controls overall access to the construction site in general, another different type of RFID for tracking by passive portals within a building on the construction site, and an RFID reader for corresponding with RFID tags located at fixed known location). It is noted that entity identifiers 105 can implement one or more location sensing technologies in a single device, or use multiple devices in various embodiments.

Entity associated ID tags 109 are additional RFID tags associated with a tracked entity 101, and with respect to a person, for example, may be affixed to safety equipment such as a fall harness, reflective vest, hard hat, ear protection, eye protection, safety shoes, tool(s) or the like. Similarly, the person may carry a dedicated GNSS location sensing technology or electronic device (e.g., smart phone) running a GNSS location sensing application; either or both of which report sensed location information to the system when in adequate view of GNSS signals. Active devices such as a dedicated GNSS tracking device 106 and a GNSS Enabled Device 107 running a tracking application may report directly to multi-modal entity tracker 140 or report through a wired or wireless communication with a tracking data receiver 110 (e.g., a WIFI router). In at least one embodiment, the data stored on entity identifiers 105 is encoded according to a security algorithm. In one embodiment, a multi-mode identification 108 utilizes, for example, a secure RFID medium and an unsecure RFID medium in the same package. The secure RFID medium is used for secure access to areas which use security sensing technologies to restrict access while the unsecure RFID medium is used for tracking tracked entity 101 in unsecure areas. It is further noted that RFID tags used as entity associated tags 109, or some other aspect of an entity identifier 105, can be embedded in a suitable form factor for workers in particular environments in accordance with various embodiments. For example, an RFID tag may be embedded in clothing articles such as badges, lanyards, hard hats, arm pouches, shoulder pads, etc. in accordance with various embodiments.

Tracking Data Receiver(s)

Some types of tracking data receivers 110 include one or more reader technologies for interacting with one or more location sensing technologies that may be carried by or affixed to an entity such as tracked entity 101. These reader technologies can interrogate these location sensing technologies (i.e., read one or more RFID tags) and/or be interrogated by the location sensing technology (such as if an RFID reader is coupled with an asset). Tracking data receivers 110 may be in the form of entry control portals 112 and passive tracking portals 113. Fixed location tracking data receivers 110 in the form of entry control portals 112 may be disposed at locations which are choke points and which may also include physically obstructive traffic control devices (e.g., turnstiles or lockable doors/gates). Fixed entry control portals 112 may simply be readers located at points where people and assets are required to freely pass through (e.g., doorways, stairwells, hallways) as they proceed from one area of a site/building into another. These portals interact with the location sensing technology carried by or affixed to an entity such as tracked entity 101 and report the interactions through a transceiver to a central data collection, management, and control portion of the system which is shown in FIG. 1 as multi-modal entity tracker 140. These portals, as well as collection point (s) 111 and passive tracking portal (s) 113, may also utilize other sensing technologies including, but not limited to cameras, infra-red cameras, 3-D scanners, motion sensors, door open/closed sensors, optical sensors, biometric sensors, etc. For the sake of the present discussion, the term "free-flow location sensing" is directed to a sensing technology in which tracked entities (101, 102, 103, etc.) are detected without the necessity of any interaction or intervention by the tracked entity (101, 102, 103, etc.). Non-fixed tracking data receivers include dedicated GNSS tracking devices 106 and/or GNSS enabled devices 107 (e.g., a smart phone) that run a tracking application which is enabled to operate and report location information to the system 100 at least when within a geofence associated with the construction site. Other types of tracking data receivers 110 include collection points which may be located or set up at emergency assembly collection points, which may or may not be a fixed location, and wired or wireless communications such as WIFI routers. In some embodiment, a mobile reader 115 can be used to identify a tracked entity 101 at an emergency assembly point or other location. For example, the mobile reader 115 can be a handheld device such as a barcode scanner, magnetic stripe reader, or RFID reader that is used at an entry, exit, and/or emergency assembly collection point of a site.

In one example, various access controls are utilized with portals. For example an entry control portal 112 for a site may wirelessly read a person's ID, take an image of the person, and also require input of biometric information (e.g., a fingerprint scan) to permit initial access to the site through a turnstile. For the purpose of the following discussion, the term "secure access location sensing technology" refers to a sensing technology in which a tracked entity 101 actively interacts with the system to positively identify the tracked entity 101. For example, swiping a magnetic identification card, entering a passcode, or providing biometric information comprise non-limiting examples of secure access location sensing technology used in accordance with various embodiments. Passive tracking portals 113 may then track the person throughout other portions of the site. Upon exit from the site, similar protocols as required for entry may be required to positively ensure identification of the person as the depart the site.

Multi-Modal Entity Tracker

The multi-modal entity tracker 140 may include one or more transceivers 141 for communication with one or more tracking data receivers 110, which may operate on differing types of communication that can be wireline or wireless (e.g., wired/wireless communication(s) 114). Thus, a tracked entity 101 that includes multiple modes of entity identifiers 105 may be tracked based on a plurality of the modes that get reported to the multi-modal entity tracker 140. Based on a particular location of a tracking data receiver 110, which is located at a known or knowable location, a location determiner 142 associates a location with a report received from a tracking data receiver 110. The known or knowable location may be a latitude/longitude (and possibly elevation), may be referenced to a local coordinate system, and/or may be associated with regions or locations on a site map and/or building information as several non-limiting examples. A known location is determined in advance or at time of installation of a tracking data receiver 110, while a knowable location is one that may be determined after installation, such as via trilateration from other known locations (e.g., with trilateration from signals of other portions of system 100 that are located in known locations) or via GNSS signals received by the tracking data receiver 110. The determined location associated with a tracked entity 101 can be stored within a location storage 143 (e.g., memory, disk storage, or the like) for later access and/or in conjunction with an entry in an entity tracking database/system 144 which may be linked with or integrated with an enterprise resource planning system, human resources management system and/or other database/system. Rules associated with a tracked entity 101 for which a report is received can then be applied (e.g., send a report if this entity is in a location that it is restricted from being in). A report generator 146 can access the location storage 143 and the entity tracking databases 144 to automatically generate reports 151 and/or generate user-specified reports 152 upon user interaction with a user-interface 147 that is provided by the multi-modal entity tracker 140. The report generator 146 may also populate or update a dashboard 156 or other monitoring display or graphical representation 155 with a graphical image used or accessed by a person such as a site manager, foreman, or security guard, among others. The report generator 146 may also push notifications 154 such as email message, pages, faxes, and/or text messages to pre-selected devices. Reports (e.g., automated reports 151 and user requested/generated reports 152) and notifications 154 may be based on control/logic rules that are configured via the user interface 147. Based on the control logic/rules, the device controller 148 may control operation of one or more devices in response to a location reported regarding a tracked entity 101. For example, positive feedback (i.e., green light, pleasant tone, door/gate/turnstile being unlocked/remaining unlocked, image/video recording initiated, biometric device being enabled) may be initiated by the device controller 148 through control of a controlled device (e.g., colored light, annunciator, lock, gate control, turnstile control, biometric identification device, camera, microphone) as an authorized entity (e.g., tracked entity 101) traverses a portal while negative feedback (e.g., red light, warning klaxon, door/gate/turnstile being locked/not unlocked, image/video recording initiated, biometric device being enabled) may be initiated by the device controller 148 through control of a controlled device when an unauthorized entity traverses or attempts to traverse a portal.

It is appreciated that all or portions of the multi-modal entity tracker 140 may be resident on a site or in a building being monitored or located remotely from a site or building being monitored.

User Data Outputs

User data outputs 150 from the multi-modal entity tracker 140 include automated reports 151, notifications 154, user requested/generated reports 152, 2-D and 3-D tracking models 153 that show current and/or historical tracked location information and may filter by any of a variety of characteristics such as a certain location on the construction site, certain trade, certain time period, etc. Other outputs can include information used to drive a dashboard 156 or a display on an electronic device (e.g., graphical representation(s) 155). In one embodiment, the data output to external data sources 130 can be filtered by multi-modal entity tracker 140 to, for example, only display the location of a single tracked entity 101 such as a person or piece of equipment. Other filtering applied by multi-modal entity tracker 140 can result in only a particular area of interest being displayed, or a particular class of tracked entities 101 (e.g., only people, tools, diagnostic equipment, etc.) being displayed. In another embodiment, the locations of tracked entities 101 are monitored to facilitate finding the tracked entities for later use. For example, the location at which a particular material is stored can be recorded and monitored using system 100. A worker who needs to use that material can be directed to the location at which it is located so that the worker does not have to lose time searching for the material. In another example, a user may need a particular tool and can be directed to where the tool is located so that time is not lost locating the equipment needed for a particular task.

External Data Sources

The multi-modal entity tracker 140 may communicate with provide information to and receive information from one or more external data sources and/or applications 130, such as, but not limited to, a Building Information Model (BIM) 131, a construction site model 132, an as built construction site model, a project management application (e.g., for access to material lists, worker schedules, and the like) 133, two-dimensional and three-dimensional maps or aerial images 134, and computer assisted drafting models and/or programs 135. For example, a map, or BIM 131, construction site model 132 (e.g., an as built construction site model), or CAD diagram 135 of a site or building may be populated with tracked entity (e.g., tracked entity 101) locations. Project management information, such as a schedule of construction events, may be used to automatically apply restrictions based on trade skill to certain regions of a site or building.

Controlled Devices

Controlled devices may include, but are not limited to, devices such as remotely controllable locks, cameras, microphones, localized feedback devices (lights, annunciators), microphones, controllable turnstiles, controllable gates, controllable biometric identification devices (finger print scanners, facial recognition scanners, voice recognition scanners), and the like.

Figure 2:
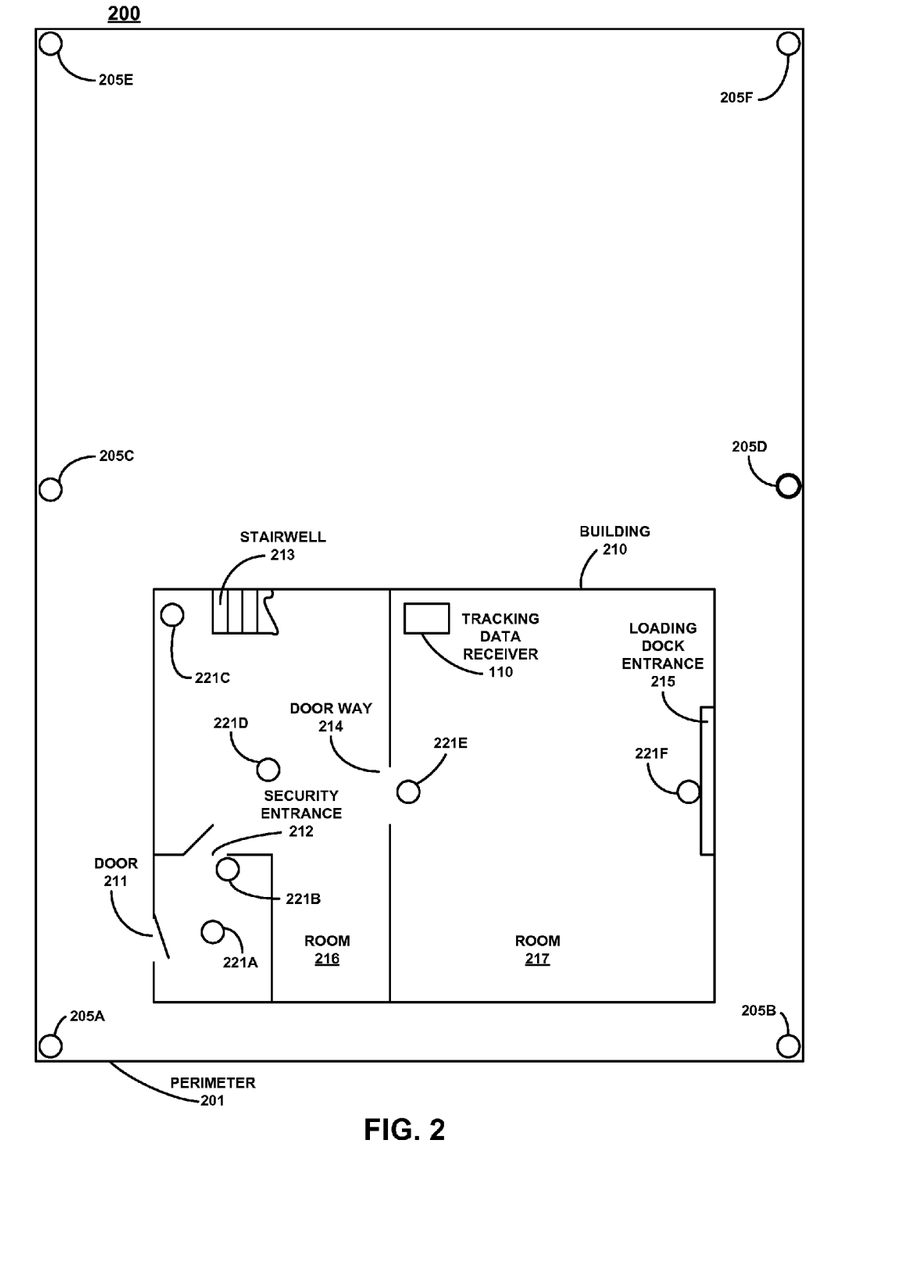
FIG. 2 is a diagram of a site implementing multi-modal entity tracking in accordance with an embodiment.

FIG. 2 is a diagram of an example site 200 in accordance with an embodiment. In FIG. 2, site 200 comprises a perimeter 201 with a plurality of sensors (e.g., 205A, 205B, 205C, 205D, 205E, and 205F) disposed at various locations of perimeter 201. In accordance with one or more embodiments, sensors 205A, 205B, 205C, 205D, 205E, and 205F are configured to detect a tracked entity 101 using any of the technologies described above with reference to FIG. 1 including, but not limited to, ultra high-frequency (UHF) radio-frequency identification (RFID), high-frequency (HF) RFID, near field communication (NFC,) magnetic stripe, low-frequency (LF) RFID, barcode, quick response (QR) code, and GNSS position determination systems. In one embodiment, a long-range RFID medium is used to facilitate multi-modal entity tracker 140 in determining the location of a person in three dimensions. For the purpose of illustration, sensor 205D is located at a designated collection point for tracked entities in the case of an emergency such as a fire, earthquake, chemical spill, etc. in which it is desired to evacuate people and other assets at a location to account for all tracked entities.

Also shown in FIG. 2, is a building 210 which utilizes a plurality of sensors (e.g., 221A, 221B, 221C, 221D, 221E, and 221F) for entity tracking within building 210. It is noted that sensors 221A, 221B, 221C, 221D, 221E, and 221F can implement the same sensing technologies described above with reference to sensors 205A, 205B, 205C, 205D, 205E, and 205F. In one embodiment, tracking system 100 can implement one type of sensing technology outdoors such as around the perimeter 201 of site 200 (e.g., sensors 205A, 205B, 205C, 205D, 205E, and 205F), and use another type of sensing technology (e.g., RFID) indoors such as sensors 221A, 221B, 221C, 221D, 221E, and 221F. In building 210 are a door 211, a security entrance 212, a stairwell 213, a doorway 214, and a loading dock entrance 215. In accordance with an embodiment, sensor 221A is disposed at door 211. For the purpose of illustration only, it is assumed that door 211 is not a secured entrance. In one embodiment, sensor 221A may comprise a passive tracking portal as there is no need for secured access into building 210 via door 211. However, sensor 221B comprises an entry control portal 112 which is configured to identify a particular person using secure access location sensing technology, as described above, and allow access into room 216. In FIG. 2, sensor 221C is disposed proximate to stairwell 213 to monitor tracked entities 101 such as people or other assets which are going up/down stairs within building 210. It is noted that additional sensors (not shown) may be disposed at the other end of stairwell 213, as well to provide better monitoring within building 210. Furthermore, in one or more embodiments, sensors can be disposed within elevators or other lifting devices to monitor and report the location of tracked entities 101. Sensor 221D is disposed in the room 216 to monitor tracked entities 101 such as people and other assets. Sensor 221E is disposed at doorway 214 to monitor tracked entities 101 which are moving between room 216 and room 217. Sensor 221F is disposed at loading dock entrance 215 to monitor the movement of tracked entities 101 into/out of room 217 via loading dock entrance 215. It is noted that the number and placement of sensors 205A, 205B, 205C, 205D, 205E, and 205F as well as sensors 221A, 221B, 221C, 221D, 221E, and 221F is for the purpose of illustration only, and that fewer or greater numbers of these sensors may be used in accordance with various embodiments. In one embodiment, sensors 221A, 221C, 221D, 221E, and 221F are passive tracking portals which can monitor the free flow of tracked entities 101 within building 210 without the necessity of user intervention. It is noted that while the above description describes monitoring the location of tracked entities within a defined perimeter 201 (e.g., within site 200), various embodiments are not limited to entity monitoring within a given site alone. For example, vehicles equipped with a multi-mode identification 108 can use RFID tags and readers to facilitate monitoring the location of the vehicle within a given site, and can use a GNSS receiver to facilitate monitoring the location of the vehicle outside the given site.

In the embodiment of FIG. 2, sensors 205A, 205B, 205C, 205D, 205E, and 205F as well as sensors 221A, 221B, 221C, 221D, 221E, and 221F are communicatively coupled with tracking data receiver 110. In one embodiment, when a tracked entity 101 is detected by one of the sensors shown in FIG. 2, that event is time stamped (e.g., by the sensor itself, or by tracking data receiver 110). This data is sent to multi-modal entity tracker 140 and facilitates tracking the movement of a tracked entity 101, including the direction of movement, based upon the succession of time stamps from the various sensors which detected and monitored a tracked entity 101.

Example Applications Enabled by a Multi-Modal Entity Tracking System

Safety and Evacuation

Conventionally, in the case of an emergency or evacuation situation, the locations of personnel on a construction site are unknown. Furthermore, there is no means to know who is inside a building and whether a particular person has left the building.

In one embodiment, the system 100 tracks which floor and which section of a large building a person (e.g., tracked entity 101) is on by virtue of portals (e.g., entry control portals 112) at into/out of each floor or reader gated section of a building and active location technologies carried by the person (e.g., dedicated GNSS tracking device 106 and/or GNSS enable device running a tracking Application 107). As an example, referring to FIG. 2, tracking data receiver 110 can receive reports from sensors 205A, 205B, 205C, 205D, 205E, and 205F which describe when a tracked entity 101 has crossed perimeter 201 as well as providing the current location at which that tracked entity 101 is located at site 200. Similarly, sensors 221A, 221B, 221C, 221D, 221E, and 221F can provide this information to tracking data receiver 110 when a tracked entity 101 enters building 210.

The system 100 receives information from tracking data receivers 110 and/or GNSS devices (e.g., dedicated GNSS tracking devices 105A and/or GNSS enabled devices running tracking applications 107) and keeps track of when each person (e.g., tracked entity 101) enters or leaves a floor or controlled section (e.g., rooms 216 and 217 of FIG. 2) of a building (e.g., 210 of FIG. 2) or construction site (e.g., 200 of FIG. 2). In an emergency when a building (e.g., 210 of FIG. 2) or portion of a construction site (e.g., 200 of FIG. 2) needs to be evacuated, the tracking data receivers 110 and/or GNSS location sensing technology track the exit of people (e.g., tracked entity 101) from each floor, region, or portal controlled section of the building/construction site (e.g., building 210 and site 200 respectively) and report to the system 100 so that a responsible person (e.g., a guard) can tell if a building (e.g., 210 of FIG. 2) or evacuated area (e.g., room 216 of FIG. 2) is empty, and if not who is still in the building/area under evacuation and where they are located (e.g., where they were last reported as being). In this manner a guard or other responsible person such as a site foreman can watch an electronic display which counts down people who as they are exiting from the building (e.g., 210 of FIG. 2) and quickly be provided with an exception list in an emergency which indicates any persons still inside of a building (e.g., 210 of FIG. 2) and where they are located. Thus, each tracked entity 101 can be quickly accounted for and, if they have not yet evacuated the building 210 or site 200, can be more easily located for evacuation or rescue.

Figure 3:
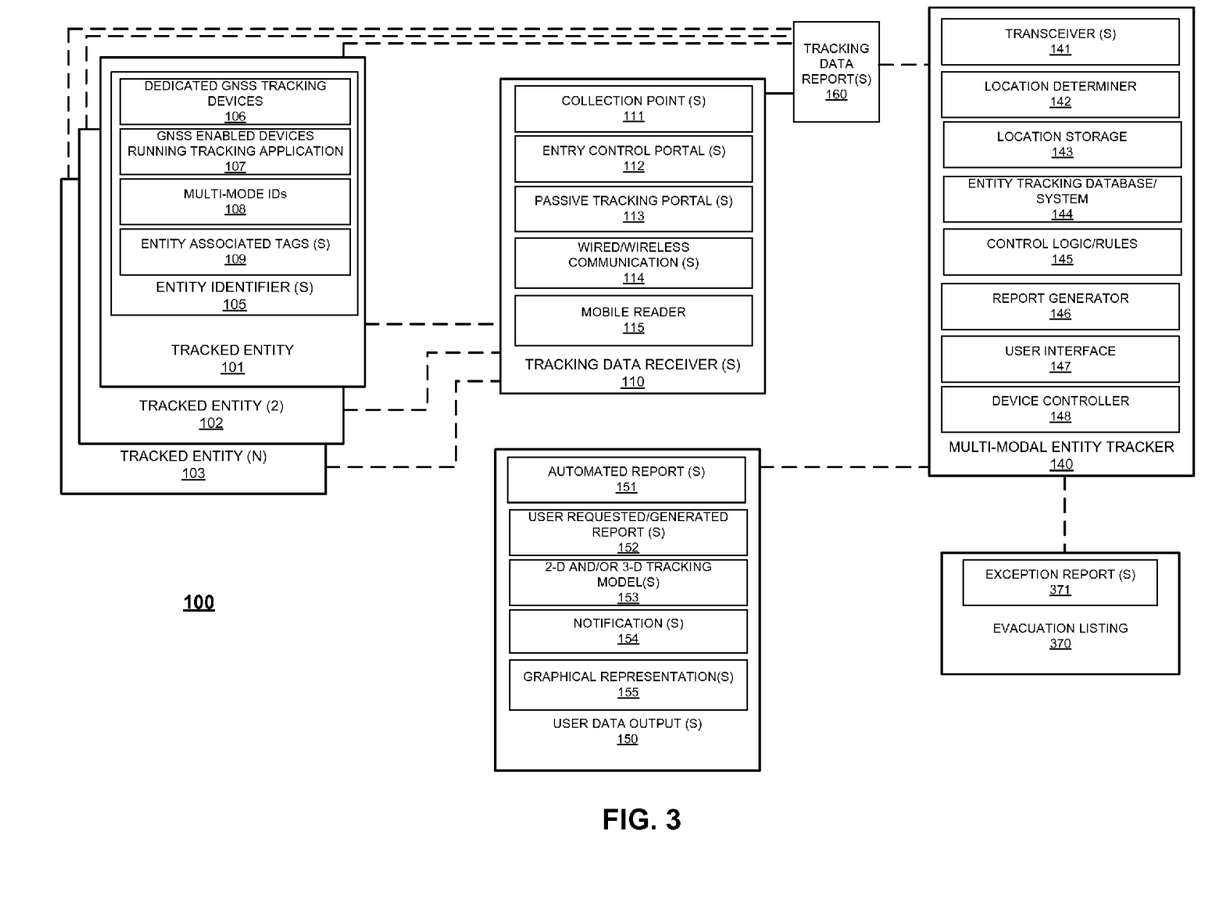
FIG. 3 is a block diagram of an example safety and evacuation system for monitoring the location of tracked entities in accordance with one embodiment.

Additionally, in some embodiments, the system 100 comprises one or more collection points 111 (e.g., sensor 205D of FIG. 2) which are readers typically located outside of a building and at which persons collect at following an evacuation or other announced emergency. Collection point 111 readers may include a backup source of power and/or communication to ensure robust functioning in an emergency situation which may take down a primary source of power and/or communication. Readers at a collection point 111 read the entity identification of a person (e.g., tracked entity 101) as the person checks in at the collection point 111. In this fashion the collection point 111 can produce an electronic evacuation listing (e.g., 370 of FIG. 3) (which may be displayed, printed, or electronically accessed/delivered) of people who have checked in at a particular collection point 111. This evacuation listing 370 replaces and is much faster than the conventional method of yelling out names and manually checking persons off of a list. Collection points 111 are also communicatively coupled as part of the system 100 and report information collected (e.g., via tracking data receiver 110, or directly to multi-modal entity tracker 140) so that a master list of collected people (e.g., evacuation listing 370) can be created as entity identifications of the people are wirelessly read at the collection points 111. In one embodiment, evacuation listing 370 comprises a master list of checked in persons from all collection points 111 at a construction site (e.g., 200 of FIG. 2) can be displayed, printed, or electronically accessed/ delivered (e.g., such as a notification 154 to a manager, foreman, or emergency response unit). The speed of creating such an evacuation list 370 of collected persons also allows for exceptions (e.g., unaccounted for persons at a collection point) to be noted, reported, and dealt with more swiftly. In one embodiment, evacuation listing 370 further comprises an exception report 371 listing people or other tracked entities which have not yet checked into a collection point 111.

Among other situations, system 100 is useful in emergencies which require positive accounting of persons. Some non-limiting examples include fires or earthquakes which require evacuation of a building, and tornadoes which require gathering of all persons in a designated shelter. In one embodiment, a collection point 111 (e.g., sensor 205D of FIG. 2) may be placed at the entry of a tornado shelter. In some embodiments, the system 100 operates in a safety mode when manually triggered by a responsible entity (i.e., a guard, foreman, or manager), or may be automatically engaged in the safety mode in response to an emergency indication such as the pulling of a fire alarm on the construction site, occurrence of a power outage, receipt of a tornado warning, sensing of an earthquake, or the like. In the safety mode, the system 100 may automatically begin generating exception reports 371 (e.g., listing people who have not left the building and/or collected at a collection point 111) at pre-defined time intervals and then pushing such reports to designated location and/or entities. An exception report 371, in one embodiment, lists people whose whereabouts are unconfirmed (e.g., were known to have entered a site/building) but who have not been affirmatively noted as having left the site/building and/or who have not affirmatively checked in at a collection point 111. In some embodiment, even if portals (e.g., passive tracking portals 113) do not track that a person has left building 210 and/or site 200, the person may be noted by the system 100 to have exited the building 210 if they: a) check in at a collection point 111; and/or b) have their location tracked by another mode of location sensing technology such as by a dedicated GNSS tracking device 105A and/or a GNSS tracking application 107 on an electronic device that is carried with or associated with the person (e.g., tracked entity 101) and which reports to the system 100. In such a safety system there may be a priority of reports, and the highest priority may be associated with the person being checked in at a collection point 111. Thus, even if no passive tracking portal 113 (e.g., sensor 221F of FIG. 2) or location tracking device/application (e.g., 105A or 107 respectively) reported the person as having left a building, or an entity identifier 105 such as a dedicated GNSS device 105A was dropped by the person and continues to report their location as in the building 210 or at some other location of site 200, checking in at a collection point 111 will take priority with respect to affirmative tracking of the person's location.

For safety purposes, each time a person's ID is tracked, tags associated with safety equipment or tools associated with the person can also be scanned. This can determine if a person does not have a particular piece of safety equipment such as a hard hat, where such safety equipment is required.

Restricted Areas

In a relatively open construction project, such as prior to partitions and doors being installed, monitoring the access of restricted areas is all but impossible with conventional technologies.

The system 100 described herein, makes it possible to monitor access to restricted areas to include arrival, presence, and departure of monitored various tracked entities 101 such as people and assets (machines, tools, materials, objects). In the most general sense, restricted areas on a construction site are typically areas that are designated for access only by persons of a particular trade or level of training. Trades are skill sets possessed by one or more workers such as being a plumber, electrician, steel worker, framer, dry-wall worker, ceiling tile installer, concrete worker, heating ventilation and air conditioning installer, etc. Conflicts can occur when two trades are trying to accomplish work in an area simultaneously. For example, both electricians and plumbers may need access to the same portions of a structure to install wiring and pipes respectively. If both are trying to do their work in the same space at the same time they will get in the way of one another, work less efficiently, slow the schedule, and possibly anger one another. Moreover, sometimes it is required to perform skilled labor in a particular sequence to gain maximum efficiency. For instance, if ceiling tile were installed before wiring was placed in the ceiling, the tile would have to be removed by electricians, thus slowing the electricians and possibly damaging the tile. Similar conflicts may occur with various combinations of skilled trades and work sequencing. By restricting access of a trade to a designated area, such conflicts can be minimized or eliminated. However, simply saying that such restrictions exist does nothing to effectively track whether they are being abided by and does nothing to enforce the restrictions. Further, the restrictions may change frequently during the course of a project as work is completed and may become very specific to even include experience level restrictions within a trade (e.g., an apprentice electrician may not have access to a certain area where a particular electrical system needs to be installed, while a journeyman or master electrician will have such access). Such restrictions based on skill level within a trade or the particular type of trade required to perform an item of work may be based on building code regulations, union rules, contractual conditions, and the like. It is appreciated that access can also be restricted for other reasons than for these business process type reasons. For example, access can be restricted to promote safety. For example, if a fall hazard existed in an area, access could be limited only to iron workers. Likewise, access may be restricted based on security clearance of workers. For example, an electrician may require a certain level of security clearance to work in a particular part of a building being built for a government client.

The system 100 described herein allows a site manager or other entity to easily set and alter restrictions applied to particular floors or zones within floors. The restrictions can then be communicated to the workers. After this, the tracking of access control is then completely automated and hands off from the perspective of the site manager or other entity. That is, no one needs to be stationed or walking around to check on access. Instead, entry to, presence in, and departure from such restriction controlled areas is automatically tracked as persons and assets pass through entry control points 112 which include readers for detecting tracked entities 101. As described, the control points may be placed at choke points, such as doors, entry control portals 112 may limit passage to a single person at a time (e.g., a turnstile), may control direction of passage (e.g., turnstile), may limit access (such as by only unlocking a door once after a person's ID is read and/or biometrics are verified), and/or may allow persons and assets to freely flow through (e.g., passive tracking portals 113) while simply reading one or more trackable tags and/or identifications associated with the person or asset (e.g., multi-mode ID 108 or entity associated tag 109).

Referring again to FIG. 2, any one of, or all of, sensors 221A, 221B, 221C, 221D, 221E, and 221F can be configured as an entry control portal 112 to track and/or control the entry of workers into particular areas at particular times. Information read at the one or more control points by readers is centrally recorded, such as in a database (e.g., entity tracking database 144) and is available for future play back, for example so that a site manager or foreman can show where people have or have not been within a building being constructed. In conjunction with building information management BIM 131 software, the locations of tracked persons and assets can be displayed in real time and/or in replay on an electronic 2D or 3D representation of the building (e.g., 2-D and/or 3-D tracking models 153). Similarly, if a person or asset is noted by the system 100 as having entered an unauthorized area for that person or asset (e.g., a plumber in an electricians space, or parts for plumbing being delivered to a space where electrical work is being conducted) the system 100 can generate an exception report (e.g., automated report 151 or notification 154) which can be accessed by an authorized entity or automatically reported out to one or more designated entities (e.g., site manager, general contractor, sub-contractor). This allows almost instant notification and intervention, if required, to remedy a violation of a restricted area. In the event of an incident, collected information that has been stored can be played back for review. In accordance with at least one embodiment, BIM model(s) 131, construction site model(s) 132, 2-D and 3-D maps/images 134, and CAD model(s) 135 are used to generate 3-D representations of objects, spaces, and people on site 200 of FIG. 2. In at least one embodiment, different classes of tracked entities, objects, and spaces are color coded to convey characteristics of those tracked entities, objects, and spaces to a user of system 100.

Supervision and Control

Currently General Contractors have no means to verify whether a particular subcontractor is deploying resources on the job as contractually obligated.

For example, the report generator 146 of the multi-mode entity tracker 140 can generate a morning report (e.g., automated report 151) based on a comparison of tracked entities 101 present on the site at the beginning of the day as compared to the tracked entities 101 scheduled (such as in project management data 133 of FIG. 1) to be on a site at the beginning of the day. If, for example, 20 electricians are supposed to be on site at 8 AM to begin work, the general contractor can easily tell from such a report if some are missing if the tracked entities 101 show only 14 electricians. This can assist the general contractor in intervening early to call a sub-contractor and resolve a scheduling problem before much work time is lost.

In a similar manner a general contractor can run a report (e.g., a user requested/generated report 152) which describes how many people of a given trade were on site during a day, week, month, etc. and the number of hours that each of these persons of a given trade was on site. This can be then manually or automatically compared with reports or timesheets provided by a sub-contractor in order to note discrepancies such as over or under billing, or not performing to contracted levels.

Equipment, tools, building materials and other objects entering an area of a site (e.g., a floor of a building) can be automatically tracked by the system 100 so that it can be positively determined if necessary equipment, tools, and materials for a particular trade are in an area at a coordinated time when the persons with the skilled trade need such equipment, tools, and building materials for an assigned task. Additionally, a piece of equipment can be associated with a particular worker and it can be determined whether the worker and piece of equipment are co-located at a given time based upon, for example, tracking data report(s) 160 indicating that the worker and piece of equipment are essentially located at the same place. Thus, a notification 154 can be generated if the worker (e.g., tracked entity 101 of FIG. 1) and the piece of equipment (e.g., tracked entity 102 of FIG. 1) are not currently located at the same place. Additionally, as described above, system 100 can be used to determine the direction of travel of tracked entities such as within building 210 or at site 200 of FIG. 2. Thus, in one embodiment, if a worker (e.g., tracked entity 101 of FIG. 1) is detected moving in one direction, and an associated piece of equipment (e.g., tracked entity 102 of FIG. 1) is detected moving in a different direction, it may indicate that the piece of equipment is being stolen or misused. Thus, multi-modal entity tracker 140 can generate a notification 154 to alert a supervisor of this discrepancy. In another embodiment, system 100 can determine whether a worker is wearing required safety equipment in order to enter a dangerous area or perform a particular task. For example, by monitoring whether the worker (e.g., tracked entity 101 of FIG. 1) is wearing a safety harness (e.g., tracked entity 102 of FIG. 1), multi-modal entity tracker 140 can determine if the worker is entering a restricted area, or performing a particular task, with the necessary safety equipment. In one embodiment, entity identifiers 105 can also determine whether a worker has possibly been injured by incorporating, for example, a fall-detection sensor or a no-movement sensor in the worker's equipment.

A supervisor can be notified if a person enters an area that they have not had proper safety training to work within, and/or if the person does not have the proper safety equipment to be in a particular area. Similarly, a supervisor can be apprised if a worker enters a site but there is no immigration paperwork on file for the person. Additionally, a supervisor may use a dashboard type display (e.g., dashboard 165) or visualization of the site (e.g., 2-D and/or 3-D tracking model 153), or report request in order to quickly locate the whereabouts of a particular person on a site. Similarly, if an asset is reported as stolen or missing, a supervisor may use a dashboard type display (e.g., dashboard 165) or visualization of the site (e.g., 2-D and/or 3-D tracking model 153), or report request in order to quickly locate the whereabouts of a particular asset on a site or to determine how/when the asset left the site.

Project Management

Currently General Contractors do not have any means to monitor the personnel deployed on a job and use the data for project management and coordination between tasks and subcontractors.

Using system 100, graphical play back of historical data (e.g., graphical representations 155) on a display device can allow for dispute resolution and analysis of workflow, as the tracked information in a building and on a construction site can provide almost complete picture of people and material flow in time and space with respect to a construction site. This allows analysis of work flow and work performance for timeline and efficiency purposes. It also allows comparison of an actual deployment of personnel and assets with a schedule/plan to determine whether and by how much they actual work and scheduled/planned work agree or differ. This can assist a project manager in determining the extent to which a project is on schedule/plan or behind and in determining how to rearrange a project schedule if work has slipped or gotten ahead of schedule.

Similarly, if a project is scheduled to have a certain number of man-hours for a trade, the hours spent on-site by particular trade can be tracked and accumulated and compared, using system 100, to scheduled burn rates of such hours to determine if a project is ahead or behind scheduled labor use.

A general contractor can use system 100 to share this information with one or more subcontractors by pushing out selected tracked entity data and/or by selectively allowing access to tracked entity data.

A general contractor can use a comparison of bid information with automatically tracked information related to skilled trades to determine if a sub-contractor over or under bid the amount of time it would take to perform a portion of work.

Personnel and Productivity Metrics

Currently General Contractors do not have any means to record the personnel deployed on a job and use the data retroactively for data mining and to improve processes and productivity.

In accordance with one embodiment, the report generator 146 of the multi-mode entity tracker 140 can generate a morning report (e.g., automated report 151) based on a comparison of tracked entities 101 present on the site at the beginning of the day as compared to the tracked entities 101 scheduled (such as in project management data 133 of FIG. 1) to be on a site at the beginning of the day. If for example 20 electricians are supposed to be on site at 8 AM to begin work, the general contractor can easily tell from such a report if some are missing if the tracked entities shows 20 plumbers and zero electricians. This can assist the general contractor in intervening early to call a sub-contractor and resolve a scheduling problem before much work time is lost. Similarly, tracked entity data can be utilized to automate time cards for tracked persons, as a complete record of on-site time of a tracked entity 101 is maintained.

Tracked entity information may be filtered by various categories (such as asset type or trade skill) and displayed on a 2D or 3D representation (e.g., 153) of a site and/or played back over time (a fourth dimension) to assist in visualization of work flow and productivity. This can facilitate evaluating work performance, as a comparison can be made of the time recorded for performing a task with some other metric such as a projected time for performing the task based upon past experience. As a result, it can be determined whether a task took more time than was anticipated and, if so, why the task took longer than expected.

In accordance with one or more embodiments, an entity identifier 105 is used to convey other data than just the identity of a tracked asset. For example, a tool or other piece of equipment can be configured to generate usage metrics which can be conveyed via entity identifier 105. For example, if a WIFI router is used as a passive tracking portal 113, additional data can be conveyed to tracking data receiver 110 such as the amount of time a tool has been operated, the operating parameters of that tool during a given time period, or self-diagnostic information which can be used to determine if the tool requires maintenance. Thus, multi-modal entity tracker 140 can generate a report (e.g., automated report 151 and/or user requested/generated report 152 which conveys the usage time of an asset, the work performance of that asset, etc. This information can be used to determine whether equipment is being properly used, maintained, or if the equipment is wearing out. For example, if it takes longer than anticipated to drill a hole using a drill (e.g., tracked entity 102) it may indicate that the drill bit is worn out, or that the motor of the drill is failing.

Example of Implementation of the Multi-Modal Entity Tracking System

The following discussion describes various aspects of the multi-modal tracking and display infrastructure (e.g., system 100) in accordance with at least one embodiment. It is noted that the following discussion is not intended to imply that the features described below are mutually interdependent, but rather can be implemented separately and/or concurrently, or in conjunction with one another.

In one embodiment, when a new worker arrives at a site (e.g., site 200 of FIG. 2, that worker will first participate in a registration/commissioning process. As an example, the worker's picture is taken and is entered into a database such as entity tracking database 144. Relevant personal data of the worker is either pulled up from a previously stored data record, or is entered on the spot. The worker is then given a unique RFID card (e.g., entity identifier 105). The RFID card comprises a unique electronic code. This code is also printed on entity identifier 105 in human readable form and, optionally, in other auto-identification technologies such as barcodes, 2-D/3-D barcodes, near field communication technology, GNSS position determination technology, etc. The electronic information on entity identifier 105 may also comprise multiple RFID codes such as encrypted codes, low frequency RFID codes, high-frequency-based RFID codes, ultra-high frequency based codes, quick response codes, magnetic swipe codes, etc.

Similarly, assets such as tools, materials, or other equipment can be associated with their own entity identifier 105 at various points in the supply chain. For example, materials can be tagged at the point of manufacture, at a distribution facility, or upon receipt at site 200. Capital equipment and tools likewise can be tagged at the manufacturer's site, at the contractor's site, or at site 200. Fixed readers and/or handheld readers can be used for tag commissioning. Once personnel and equipment is assigned a unique ID in system 100, specific equipment can be associated with specific personnel. For example, a particular worker may have a set of personal safety equipment issued such as a hard hat and a safety vest which are associated with that worker in multi-modal entity tracker 140. It is noted that the personal safety equipment, as well as other equipment assigned to a worker, may have the auto-identification technology embedded within in a suitable form factor.

Also during the registration process, the worker can enable an application on their smart phone, or other device, (e.g., 107 of FIG. 1) that is capable of sensing the location of the smart phone and transmit that information to multi-modal entity tracker 140 as a background process. In accordance with at least one embodiment, the background process is restricted to function only within a defined area such as within perimeter 201 of FIG. 2 unless configured to operate in a wider area.

Once the worker has completed the registration process, he is granted access to site 200 by scanning identity identifier 105 at an entrance to site 200 such as at a turnstile or other barrier. Alternatively, the workers can freely enter site 200 and a long range RFID reader monitors the flow of people onto site 200 and can generate an alert if a person tries to enter the site who is not properly registered. In another embodiment, security personnel can scan entity identifiers 105 using, for example, a handheld scanner such as mobile reader 115 and also verifying the workers' identities as well. Entity identifiers 105 do not need to be visible during the scanning, but can be hidden in clothing or other accessories. Upon scanning, the security personnel can see an image of the worker on a handheld screen and can verify that the scanned entity identifier 105 is in fact associated with that worker.

During the workday, the individual worker can access multiple different spaces. Each space has readers (e.g., passive tracking portals 113) places at its entrances and throughout the space as needed to provide better coverage of the space. As a worker passes through the spaces, reader antennas scan the entity identifiers 105 of the worker and pass the information on to entity tracking database 144. As a result, a correct record of the current location of the worker is maintained by multi-modal entity tracker 140. Because RFID sensors are installed at choke points such as entrances, they can monitor the flow of people and other assets as they move around site 200 without requiring explicit scanning by users. The use of multiple sensors throughout site 200 permit inferring the movement of workers and assets throughout the site and permit monitoring the location of all assets and personnel at a site at all times. Furthermore, in both free-flowing and secure access sensing situations, the co-location and co-movement of assets and people can be inferred. As an example, assets and people sensed at the same time in the same location can be assumed to be co-located or co-moving. Furthermore, as specific workers can be associated with specific pieces of equipment, multi-modal entity tracker 140 can determine whether un-authorized personnel are carrying equipment assigned to another worker.

Alerts (e.g., notification 154) can be generated when a particular combination of assets and personnel is determined to be in a particular location or zone within a site. For example, certain workers may not be allowed to enter certain work areas of site 200, or to use certain types of equipment. Alternatively, a particular piece of equipment may not be allowed to be used in a particular area of site 200. In another example, a certain type of material is not suitable for use with a particular piece of equipment. By monitoring the location of personnel, material, and other assets, multi-modal entity tracker 140 can determine if restricted conditions are being violated and generate notification(s) 154 to allow preventative action to be taken.

In accordance with one embodiment, entity identifiers 105 can include a wired data connection to another processor that is part of the tagged asset. For example, the entity associated tag (e.g., 109) on an expensive hand power tool may be connected to the tool main micro-processor. As the tool is being used, the main processor stores information about the usage of the tool, its maintenance work, possible failures, and general diagnostics in the RFID memory of the entity identifier 105. As the entity identifier is being sensed by a reader at site 200, this information is uploaded through the RFID interface. From the data, it can be inferred how much time the tool was used, when it was last serviced, if it requires maintenance, if it has a flaw creating a safety hazard, etc. Some assets may be tagged with other sensor tags to provide additional information about the state and/or usage of the asset. For example, a tag (e.g., entity identifier 105) on a hand tool may include a motion sensor, which determines if the tool is being handled at any one moment. Upon passing a reader disposed at site 200, the recent log of motion events is uploaded through the RFID interface. From the data, it can be inferred how much time the tool was used since the last RFID read. Thus higher level information can be inferred from the raw sensing data which includes, but is not limited to: usage of a tool by a person; usage of materials by a worker, usage of a particular material with a particular tool or piece of equipment; amount of time spent on the site by a single worker or population of workers; materials used on a site by type of material, product codes, suppliers, and other characteristics; time spent by personnel and equipment to accomplish a particular task.

Furthermore, the job performance of a contractor or worker can be compared with another worker/contractor, or against some other metric. For example, in a high-rise construction process most floors are very similar in layout and build out. From the sensor data sent to multi-modal entity tracker 140 it can be inferred how long contractor A needed to build out floor X versus how long it took contractor B to build out floor Y. It can furthermore be determined how many and what kind of workers and equipment the respective contractors deployed. Given these statistics, the general contractors can select the better performer going forward and can issue recommendations to subcontractors as to how to go about a particular job.

When a worker enters areas where the worker's mobile device (e.g., 107 of FIG. 1) has a clear view of the sky, the GNSS tracking application on his/her mobile device provides the location information to multi-modal entity tracker 140 which creates a record of the work locations at specific times while within the pre-defined perimeter 201, or within a pre-determined geo-fence within site 200. It is possible to also associate GNSS tracking devices (e.g., 106 of FIG. 1) with assets and enable a similar functionality.

In the case of an emergency that requires the evacuation of a building or a portion of site 200, the worker will leave the area as quickly as possible and check in at a pre-designated collection point where his/her entity identifier 105 is scanned or automatically detected. While the evacuation is in process, the security supervisor can check how many workers are left in the evacuation zone and follow their progress, in real-time or near real-time, as the workers progress to exits and/or the collection point.

When a worker or asset enters the field of view of an RFID reader, the reader can generate a signal to a co-located camera to take a picture of the worker or asset, or a short sequence of frames to create a record of the action taken which can be stored by multi-modal entity tracker 140. Since the footage is associated with a particular tag which was read, the library of footage can easily be browsed and mined for the complete actions of a particular worker, sub-contractor, or trade, or of a particular asset.

Based on the recorded location information collected and stored by multi-modal entity tracker 140, a number of reports on individual workers can be generated including, but not limited to: work time spent in a particular area by a particular sub-contractor or worker, or by trade, or by seniority of a worker; access violations by a worker who is only granted access to specific spaces; comparison of declared and actual work time; identification of congestion in specific areas of a site (e.g., indoors and outdoors); correlation of the location and movement of people and the location and movement of materials and other assets; identification of inefficiencies in the building process due to sub-optimal personnel management or material management, etc.

System 100 can be used to create a coverage map of an individual performing specific tasks in a specific location of a site or building. For example, an inspector is required to inspect work product on all floors of a building as well as in multiple distinct areas on the outside of the building. Using system 100, a supervisor can verify that the inspector did indeed visit all required areas along with the time when the inspection was performed. Likewise, system 100 can confirm that a particular piece of equipment was used to perform the inspection.

Figure 4:
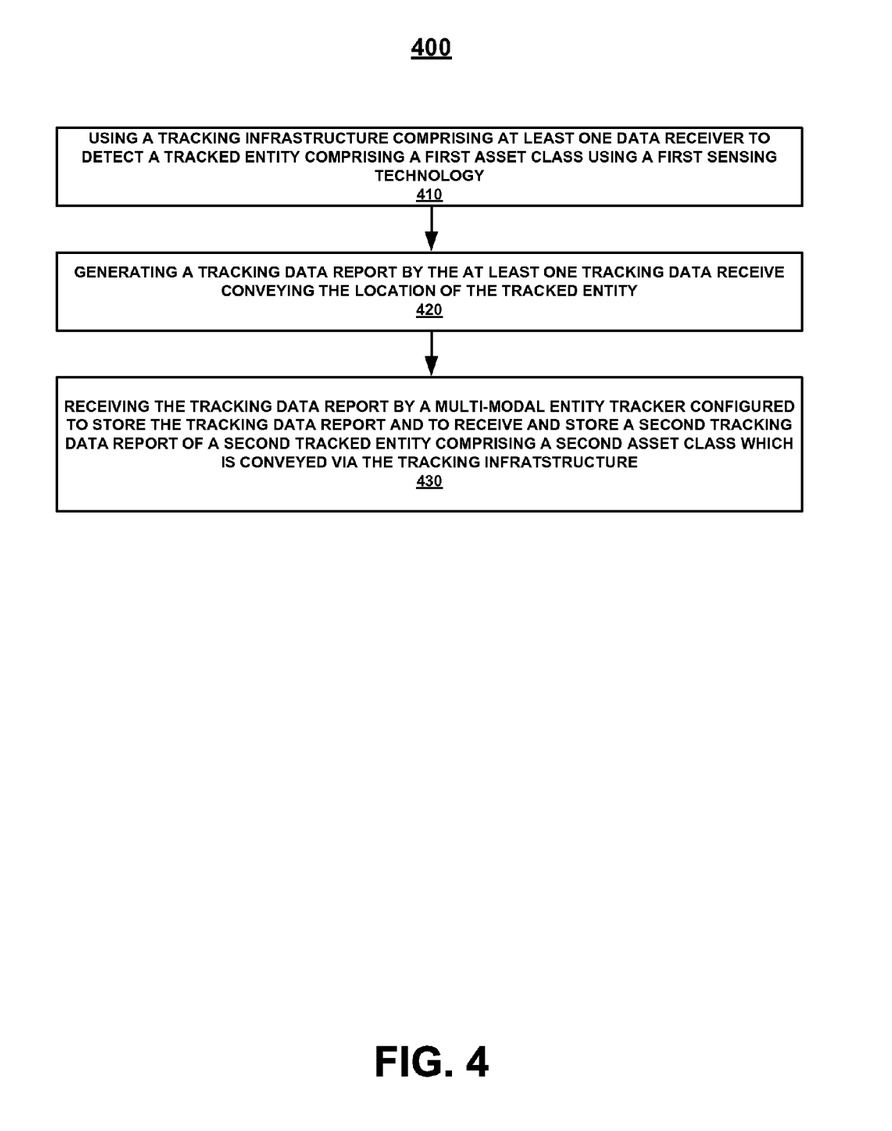
FIG. 4 is a flowchart of a method for tracking an entity in accordance with at least one embodiment.

FIG. 4 is a flowchart of a method 400 for tracking an entity in accordance with at least one embodiment. In operation 410 of FIG. 4, a tracking infrastructure comprising at least one data receiver is used to detect a tracked entity 101 comprising a first asset class using a first sensing technology and a second sensing technology.

In operation 420 of FIG. 4, a tracking data report is generated by the at least one tracking data receiver conveying a location of the tracked entity 101.

In operation 430 of FIG. 4, the tracking data report is received by a multi-modal entity tracker configured to store the tracking data report and to receive and store a second tracking data report of a second tracked entity (e.g., 102, 103, etc.) comprising a second asset class which is conveyed via the tracking infrastructure.

Figure 5:
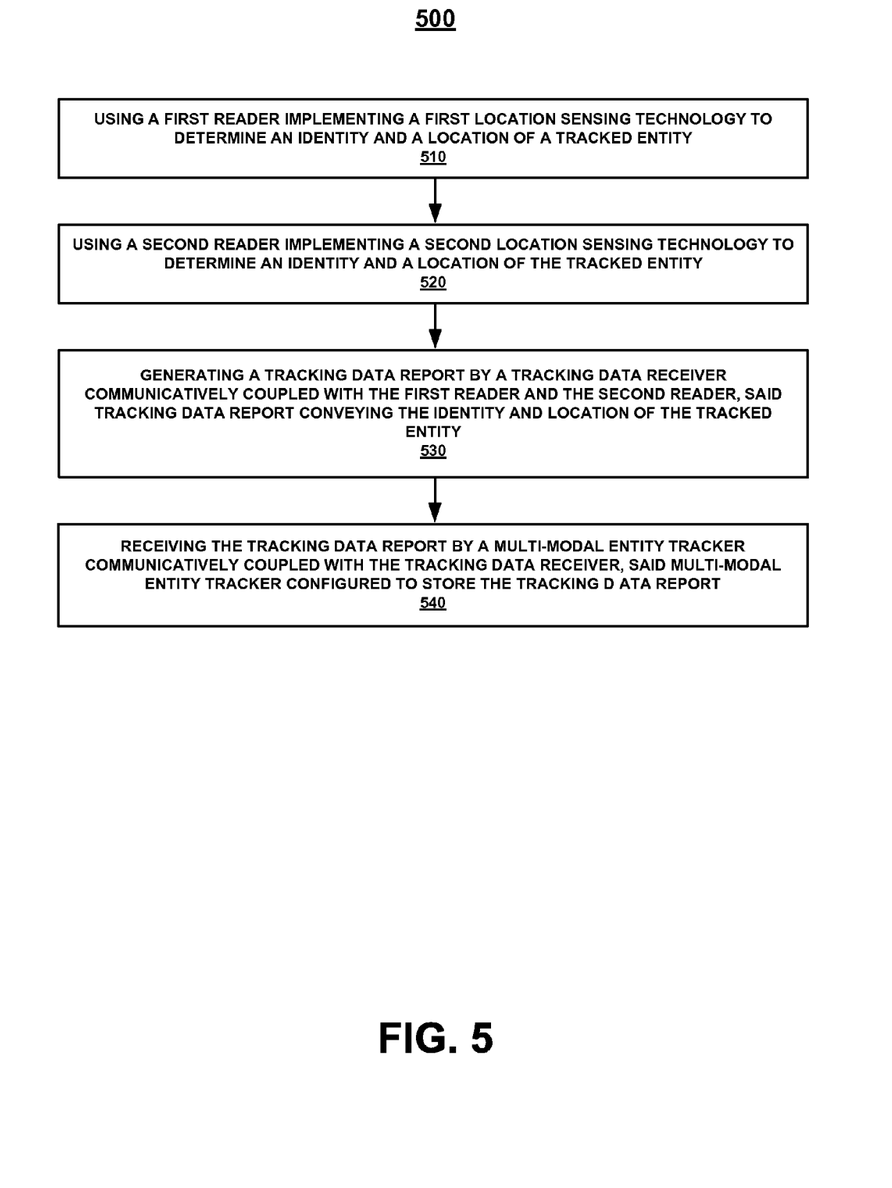
FIG. 5 is a flowchart of a method for tracking an entity in accordance with at least one embodiment.

FIG. 5 is a flowchart of a method 500 of a method for tacking an entity in accordance with at least one embodiment.

In operation 510 of FIG. 5, a first reader implementing a first location sensing technology is used to determine an identity and a location of a tracked entity 101.

In operation 520 of FIG. 5, a second reader implementing a second location sensing technology is used to determine an identity and a location of the tracked entity 101.

In operation 530 of FIG. 5, a tracking data report is generated by a tracking data receiver communicatively coupled with the first reader and the second reader, the tracking data report conveying the identity and location of the tracked entity 101.

In operation 540 of FIG. 5, the tracking data report is received by a multi-modal entity tracker communicatively coupled with the tracking data receiver, the multi-modal entity tracker configured to store the tracking data report.

Example Computer System Environment

Figure 6:
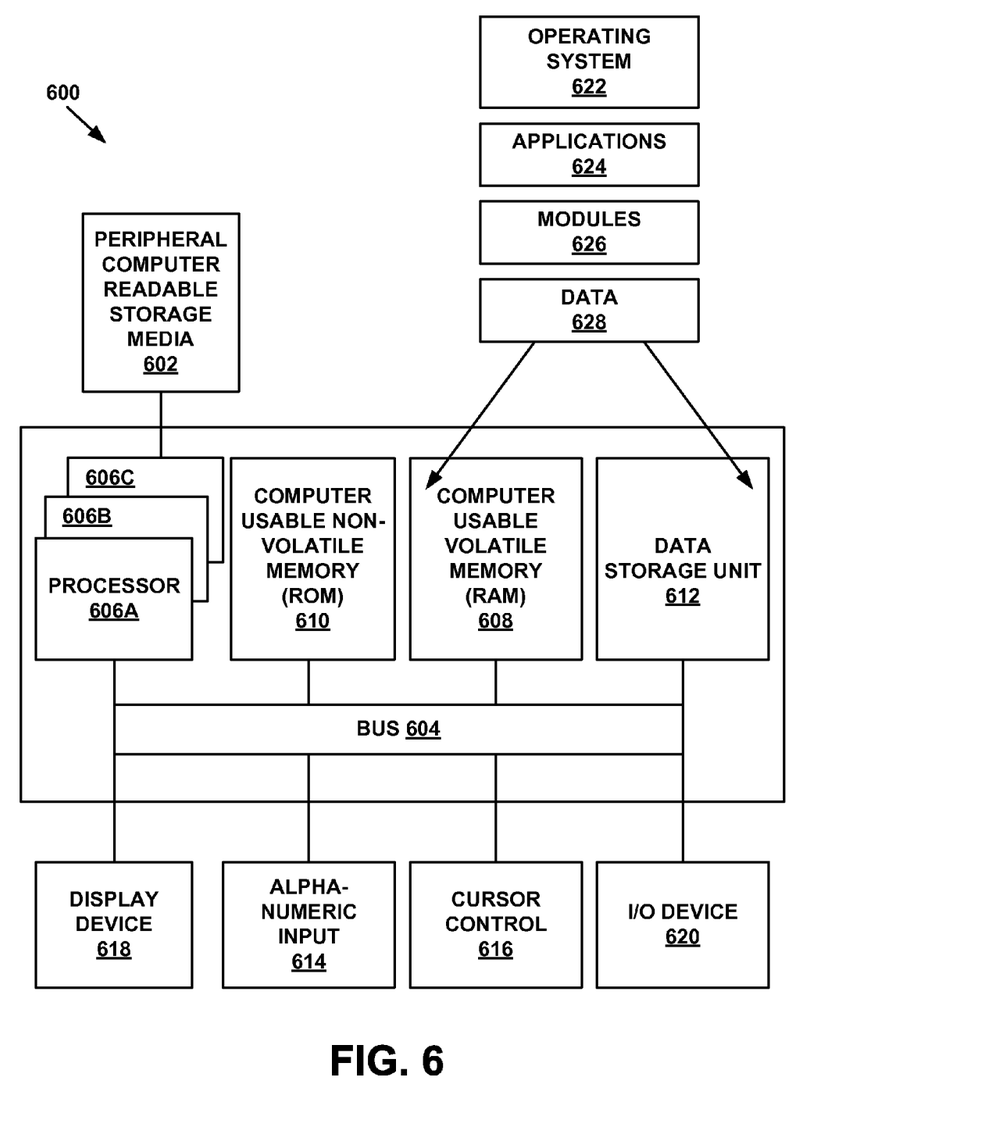
FIG. 6 is a block diagram of an example computer system on which various embodiments can be implemented.

With reference now to FIG. 6, all or portions of some embodiments described herein are composed of computer-readable and computer-executable instructions that reside, for example, in computer-usable/computer-readable storage media of a computer system. That is, FIG. 6 illustrates one example of a type of computer (computer system 600) that can be used in accordance with or to implement various embodiments which are discussed herein. It is appreciated that computer system 600 of FIG. 6 is only an example and that embodiments as described herein can operate on or within a number of different computer systems including, but not limited to, general purpose networked computer systems, embedded computer systems, server devices, various intermediate devices/nodes, stand alone computer systems, hand-held computer systems, multi-media devices, and the like. Computer system 600 of FIG. 6 is well adapted to having peripheral computer-readable storage media 602 such as, for example, a floppy disk, a compact disc, digital versatile disc, universal serial bus "thumb" drive, removable memory card, and the like coupled thereto.

System 600 of FIG. 6 includes an address/data bus 604 for communicating information, and a processor 606A coupled to bus 604 for processing information and instructions. As depicted in FIG. 6, system 600 is also well suited to a multi-processor environment in which a plurality of processors 606A, 606B, and 606C are present. Conversely, system 600 is also well suited to having a single processor such as, for example, processor 606A. Processors 606A, 606B, and 606C may be any of various types of microprocessors. System 600 also includes data storage features such as a computer usable volatile memory 608, e.g., random access memory (RAM), coupled to bus 604 for storing information and instructions for processors 606A, 606B, and 606C. System 600 also includes computer usable non-volatile memory 610, e.g., read only memory (ROM), coupled to bus 604 for storing static information and instructions for processors 606A, 606B, and 606C. Also present in system 600 is a data storage unit 612 (e.g., a magnetic or optical disk and disk drive) coupled to bus 604 for storing information and instructions. System 600 also includes an optional alphanumeric input device 614 including alphanumeric and function keys coupled to bus 604 for communicating information and command selections to processor 606A or processors 606A, 606B, and 606C. System 600 also includes an optional cursor control device 616 coupled to bus 604 for communicating user input information and command selections to processor 606A or processors 606A, 606B, and 606C. In one embodiment, system 600 also includes an optional display device 618 coupled to bus 604 for displaying information.

Referring still to FIG. 6, optional display device 618 of FIG. 6 may be a liquid crystal device, cathode ray tube, plasma display device or other display device suitable for creating graphic images and alphanumeric characters recognizable to a user. Optional cursor control device 616 allows the computer user to dynamically signal the movement of a visible symbol (cursor) on a display screen of display device 618 and indicate user selections of selectable items displayed on display device 618. Many implementations of cursor control device 616 are known in the art including a trackball, mouse, touch pad, joystick or special keys on alphanumeric input device 614 capable of signaling movement of a given direction or manner of displacement. Alternatively, it will be appreciated that a cursor can be directed and/or activated via input from alphanumeric input device 614 using special keys and key sequence commands. System 600 is also well suited to having a cursor directed by other means such as, for example, voice commands System 600 also includes an I/O device 620 for coupling system 600 with external entities. For example, in one embodiment, I/O device 620 is a modem for enabling wired or wireless communications between system 600 and an external network such as, but not limited to, the Internet.

Referring still to FIG. 6, various other components are depicted for system 600. Specifically, when present, an operating system 622, applications 624, modules 626, and data 628 are shown as typically residing in one or some combination of computer usable volatile memory 608 (e.g., RAM), computer usable non-volatile memory 610 (e.g., ROM), and data storage unit 612. In some embodiments, all or portions of various embodiments described herein are stored, for example, as an application 624 and/or module 626 in memory locations within RAM 608, computer-readable storage media within data storage unit 612, peripheral computer-readable storage media 602, and/or other tangible computer readable storage media.

Embodiments of the present technology are thus described. While the present technology has been described in particular embodiments, it should be appreciated that the present technology should not be construed as limited to these embodiments alone, but rather construed according to the following claims.

What is claimed is:

1. A multi-modal entity tracking and display system comprising:
   at least one tracking data receiver located at a fixed location, the tracking data receiver configured to:
      detect a first entity comprising a first entity class by interacting with at least one of a first sensing technology component and a second sensing technology component both disposed on the first entity, the first entity detected by using a first sensing technology to interact with the first sensing technology component and a second sensing technology to interact with the second sensing technology component, wherein the first sensing technology and the second sensing technology are different;
      generate a first tracking data report conveying a location of the first entity;
      detect a second entity comprising a second entity class; and
      generate a second tracking data report conveying a location of the second entity; and
   a multi-modal entity tracker configured to:
      receive the first tracking data report and the second tracking data report;
      determine that the first entity and the second entity are located within a predetermined range of the fixed location of the tracking data receiver at a same time based at least in part on the first tracking data report and the second tracking data report;
      determine that the first entity is associated with the second entity;
      generate a notification based on the determination that the first entity and the second entity are located within the predetermined range of the fixed location of the tracking data receiver at the same time and the determination that the first entity is associated with the second entity;
      determine co-movement of the first entity and the second entity;
      receive tracking data reports from a plurality of sensed entity classes utilizing a plurality of sensing methods; and
      determine a direction of travel of the plurality of sensed entity classes.

2. The multi-modal entity tracking and display system of claim 1 wherein the first sensing technology comprises a passive radio-frequency identification (RFID) tag and an RFID reader.

3. The multi-modal entity tracking and display system of claim 2 wherein the first sensing technology comprises a forward RFID infrastructure and the second sensing technology comprises a reverse RFID infrastructure.

4. The multi-modal entity tracking and display system of claim 1 wherein the first sensing technology is configured as a free-flow location sensing system and the second sensing technology comprises a secure access location sensing technology.

5. The multi-modal entity tracking and display system of claim 4 wherein the at least one tracking data receiver comprises a plurality of sensing mechanisms for the free-flow location sensing system and at least one sensing technology for the secure access location sensing technology.

6. The multi-modal entity tracking and display system of claim 1 wherein the multi-modal entity tracker is configured to determine a direction of travel of the first entity and the second entity.

7. The multi-modal entity tracking and display system of claim 6 wherein the multi-modal entity tracker is configured to receive information from the plurality of sensed entity classes and the plurality of sensing methods to determine the presence of a plurality of entity classes.

8. The multi-modal entity tracking and display system of claim 1 wherein the at least one tracking data receiver utilizes the first sensing technology for tracking entities indoors, and utilizes the second sensing technology comprising a GNSS system for tracking entities outdoors, and wherein the at least one tracking data receiver is further configured to transmit the first tracking data report and the second tracking data report to the multi-modal entity tracker.

9. The multi-modal entity tracking and display system of claim 8 wherein the multi-modal entity tracker is configured to determine either of a relative position or a direction of movement of the first entity class and the second entity class.

10. The multi-modal entity tracking and display system of claim 1 wherein the first entity comprises a person, and the second entity comprises an asset, and wherein the multi-modal entity tracker uses the first tracking data report and the second tracking data report to determine whether the person is using the asset.

11. The multi-modal entity tracking and display system of claim 1 wherein the first entity comprises a person, and the second entity comprises an asset, and wherein the multi-modal entity tracker uses the first tracking data report and the second tracking data report to determine a usage time of the asset by the person.

12. The multi-modal entity tracking and display system of claim 1 wherein the first entity comprises a person, and the second entity comprises an asset, and wherein the multi-modal entity tracker uses the first tracking data report and the second tracking data report to determine the usage of the asset and a work performance of the person.

13. A method for tracking a plurality of entities, the method comprising:
    accessing a tracking infrastructure comprising at least one tracking data receiver located at a fixed location, the tracking data receiver configured to detect an entity having a first sensing technology component and a second sensing technology component disposed thereon, by using a first sensing technology to interact with the first sensing technology component and a second sensing technology to interact with the second sensing technology component, wherein the first sensing technology and the second sensing technology are different;
    detecting a first entity using the tracking data receiver, the first entity comprising a first entity class;
    generating a first tracking data report using the tracking data receiver, the first tracking data report conveying a location of the first entity;
    detecting a second entity using the tracking data receiver, the second entity comprising a second entity class;
    generating a second tracking data report using the tracking data receiver, the second tracking data report conveying a location of the second entity;
    determining that the first entity and the second entity are located within a predetermined range of the fixed location of the tracking data receiver at a same time based at least in part on the first tracking data report and the second tracking data report;
    determining that the first entity is associated with the second entity;
    generating a notification based on the determination that the first entity and the second entity are located within the predetermined range of the fixed location of the tracking data receiver at the same time and the determination that the first entity is associated with the second entity;
    determining co-movement of the first entity and the second entity; and
    determining a direction of travel of a plurality of sensed entity classes from tracking data reports received from the plurality of sensed entity classes utilizing a plurality of sensing methods.

14. The method of claim 13 wherein the first sensing technology utilizes a passive radio-frequency identification (RFID) tag and an RFID reader.

15. The method of claim 14 wherein the first sensing technology utilizes a forward RFID infrastructure and the second sensing technology utilizes a reverse RFID infrastructure.

16. The method of claim 13 wherein:
    the first sensing technology is configured as a free-flow location sensing system; and
    the second sensing technology is configured as a secure access location sensing technology.

17. The method of claim 16 wherein the tracking infrastructure comprises a plurality of sensing mechanisms for the free-flow location sensing system and at least one sensing technology for the secure access location sensing technology.

18. The method of claim 13 further comprising determining a direction of travel of the first entity and the second entity.

19. The method of claim 13 further comprising:
    using the first sensing technology for tracking entities indoors; and
    using the second sensing technology for tracking entities outdoors.

20. The method of claim 19 further comprising determining either of a relative position or a direction of movement of the first entity class and the second entity class.

21. The method of claim 13 wherein the first entity comprises a person, and the second entity comprises an asset, the method further comprising:
    determining whether the person is using the asset based at least in part on the first tracking data report and the second tracking data report.

22. The method of claim 13 wherein the first entity comprises a person and the second entity comprises an asset, the method further comprising:
    determining a usage time of the asset by the person based at least in part on the first tracking data report and the second tracking data report.

23. The method of claim 13 wherein the first entity comprises a person and the second entity comprises an asset, the method further comprising:
    determining a usage of the asset and a work performance of the person based at least in part on the first tracking data report and the second tracking data report.

* * * * *